United States Patent
Lesso

(10) Patent No.: US 11,081,115 B2
(45) Date of Patent: Aug. 3, 2021

(54) SPEAKER RECOGNITION

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 36 days.

(21) Appl. No.: 16/556,582

(22) Filed: Aug. 30, 2019

(65) Prior Publication Data

US 2020/0082830 A1 Mar. 12, 2020

Related U.S. Application Data

(60) Provisional application No. 62/728,421, filed on Sep. 7, 2018.

(30) Foreign Application Priority Data

Jan. 21, 2019 (GB) .................................. 1900799

(51) Int. Cl.
*G10L 17/04* (2013.01)
*G10L 25/78* (2013.01)

(52) U.S. Cl.
CPC .............. *G10L 17/04* (2013.01); *G10L 25/78* (2013.01)

(58) Field of Classification Search
CPC ......... G10L 25/78; G10L 17/02; G10L 17/04; G10L 17/06; G10L 17/26; G10L 17/24; G10L 15/20

(Continued)

(56) References Cited

U.S. PATENT DOCUMENTS 6,246,982 B1 * 6/2001 Beigi ..................... G10L 15/10
704/238
9,741,337 B1 8/2017 Shastry et al.
(Continued)

FOREIGN PATENT DOCUMENTS

EP 0424071 A2 * 4/1991 ............. G10L 25/78

OTHER PUBLICATIONS

R. Martsyshyn and Y. Rashkevych, "Information technologies of speaker recognition," 2010 Proceedings of VIth International Conference on Perspective Technologies and Methods in MEMS Design, Lviv, 2010, pp. 163-167. (Year: 2010).*
(Continued)

*Primary Examiner* — Bharatkumar S Shah
(74) *Attorney, Agent, or Firm* — Jackson Walker L.L.P.

(57) ABSTRACT

A biometric is formed for at least one enrolled speaker by: obtaining a sample of speech of the enrolled speaker; obtaining a measure of a fundamental frequency of the speech of the enrolled speaker in each of a plurality of speech frames; and forming a first distribution function of the fundamental frequency of the speech of the enrolled speaker. Subsequently, for a speaker to be recognised, a sample of speech of the speaker to be recognised is obtained. Then, a measure of a fundamental frequency of the speech of the speaker to be recognised is obtained in each of a plurality of speech frames. A second distribution function of the fundamental frequency of the speech of the speaker to be recognised is formed, the second distribution function and the first distribution function are compared, and it is determined whether the speaker to be recognised is the enrolled speaker based on a result of comparing the second distribution function and the first distribution function.

26 Claims, 12 Drawing Sheets

(58) Field of Classification Search
USPC .......................................................... 704/246
See application file for complete search history.

(56) References Cited

U.S. PATENT DOCUMENTS

2011/0276323 A1  11/2011  Seyfetdinov
2012/0271632 A1* 10/2012  Do .......................... G10L 17/02
                                                  704/246
2017/0323643 A1  11/2017  Arslan et al.

OTHER PUBLICATIONS

K. Bhattarai, P. W. C. Prasad, A. Alsadoon, L. Pham and A. Elchouemi, "Experiments on the MFCC application in speaker recognition using Matlab," 2017 Seventh International Conference on Information Science and Technology (ICIST), Da Nang, 2017, pp. 32-37, doi: 10.1109/ICIST.2017.7926796. (Year: 2017).*

A. Fazel and S. Chakrabartty, "An Overview of Statistical Pattern Recognition Techniques for Speaker Verification," in IEEE Circuits and Systems Magazine, vol. 11, No. 2, pp. 62-81, Secondquarter 2011, doi: 10.1109/MCAS.2011.941080. (Year: 2011).*

R. Togneri and D. Pullella, "An Overview of Speaker Identification: Accuracy and Robustness Issues," in IEEE Circuits and Systems Magazine, vol. 11, No. 2, pp. 23-61, Secondquarter 2011, doi: 10.1109/MCAS.2011.941079. (Year: 2011).*

R. Martsyshyn and Y. Rashkevych, "Information technologies of speaker recognition," 2010 Proceedings of VIth International Conference on Perspective Technologies and Methods in MEMS Design, Lviv, 2010, pp. 163-167. (Year: 2010) (Year: 2010).*

K. Bhattarai, P. W. C. Prasad, A. Alsadoon, L. Pham and A. Elchouemi, "Experiments on the MFCC application in speaker recognition using Matlab," 2017 Seventh International Conference on Information Science and Technology (ICIST), Da Nang, 2017, pp. 32-37, doi: 10.1109/ICIST.2017.7926796. (Year: 2017) (Year: 2017).*

Combined Search and Examination Report under Sections 17 and 18(3), UKIPO, Application No. GB1900799.6, dated Jun. 28, 2019.

Combined Search and Examination Report under Sections 17 and 18(3), UKIPO, Application No. GB1900799.6, dated Oct. 26, 2020.

Kinnunen & Hautamaki, "Long-Term F0 Modeling for Text-Independent Speaker Recognition", Proceedings of the International Conference on Speech and Computer (SPECOM '2005), Available at https://www.semanticscholar.org/paper/Long-Term-F0-Modeling-for-Text-Independent-Speaker-Kinnunen-Hautam%CC%88aki/37068f92184ca02976caaea46bda2620d51e789a, 2005.

* cited by examiner

SPEAKER RECOGNITION

TECHNICAL FIELD

This invention relates to speaker recognition.

In this document, the term speaker recognition is used to refer to a process in which information is obtained about the identity of a speaker. For example, this process may involve determining whether or not the speaker is a specific individual (speaker verification), or may involve identifying the speaker, for example from a group of enrolled speakers (speaker identification).

The term speech recognition is used to refer to a process in which information is obtained about the content of speech, for example in order to be able to determine what the speaker is saying.

BACKGROUND

Systems that use speaker recognition are becoming common. For example, devices such as smartphones with voice assistants and smart speakers are able to detect the speech of an enrolled user, and then perform speech recognition to identify commands that are spoken by the enrolled user, and then act on those commands.

Many speaker recognition systems operate by extracting features from the speech signal, and then compare the extracted features with a model of an enrolled speaker's speech, which has been generated during the process of enrollment. Many such systems use MFCCs (Mel-frequency cepstral coefficients) as the extracted features. In situations where high reliability is required (for example when authorising financial transactions, or the like), it would be useful to combine the speaker recognition based on MFCCs with an alternative method of speaker recognition. In other situations, where high reliability is not required, it would be convenient to be able to use a method of speaker recognition that is fast and does not use large amounts of computational power.

SUMMARY

According to an aspect of the present invention, there is provided a method of speaker recognition, comprising, after forming a biometric for at least one enrolled speaker by:
    obtaining a sample of speech of the enrolled speaker;
    obtaining a measure of a fundamental frequency of the speech of the enrolled speaker in each of a plurality of speech frames; and
    forming a first distribution function of the fundamental frequency of the speech of the enrolled speaker,
    (i) for a speaker to be recognised:
    obtaining a sample of speech of the speaker to be recognised;
    obtaining a measure of a fundamental frequency of the speech of the speaker to be recognised in each of a plurality of speech frames; and
    forming a second distribution function of the fundamental frequency of the speech of the speaker to be recognised,
    (ii) comparing the second distribution function and the first distribution function,
    and
    (iii) determining whether the speaker to be recognised is the enrolled speaker based on a result of comparing the second distribution function and the first distribution function.

This has the advantage that speaker recognition can be performed using an alternative metric. In some embodiments, the speaker recognition can be performed with low power and low computational intensity.

According to a second aspect of the present invention, there is provided a method of speaker change detection, comprising:
    obtaining a sample of speech;
    in each of a plurality of time periods, obtaining a measure of a fundamental frequency of the speech;
    comparing the measure of the fundamental frequency of the speech with previously obtained measures of the fundamental frequency of the speech; and determining that a speaker may have changed in the event that the measure of the fundamental frequency of the speech differs from previously obtained measures of the fundamental frequency of the speech.

This has the advantage that speaker change detection can be performed using an alternative metric. In some embodiments, the speaker change detection can be performed with low power and low computational intensity.

According to a further aspect, there is provided a system configured to perform any of the methods defined above. For example, the system may comprise: an input for receiving an audio signal representing speech; and a processor configured to perform a method in accordance with any of the methods defined above.

The system may be implemented in electronic device, for example a smartphone or other communications device, a smart speaker, a tablet or laptop computer, a games console, a home control system, a home entertainment system, an in-vehicle entertainment system, or a domestic appliance.

According to a further aspect, there is provided a non-transitory storage medium having stored thereon software code which, when run on a suitable processor, performs any of the methods defined above.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
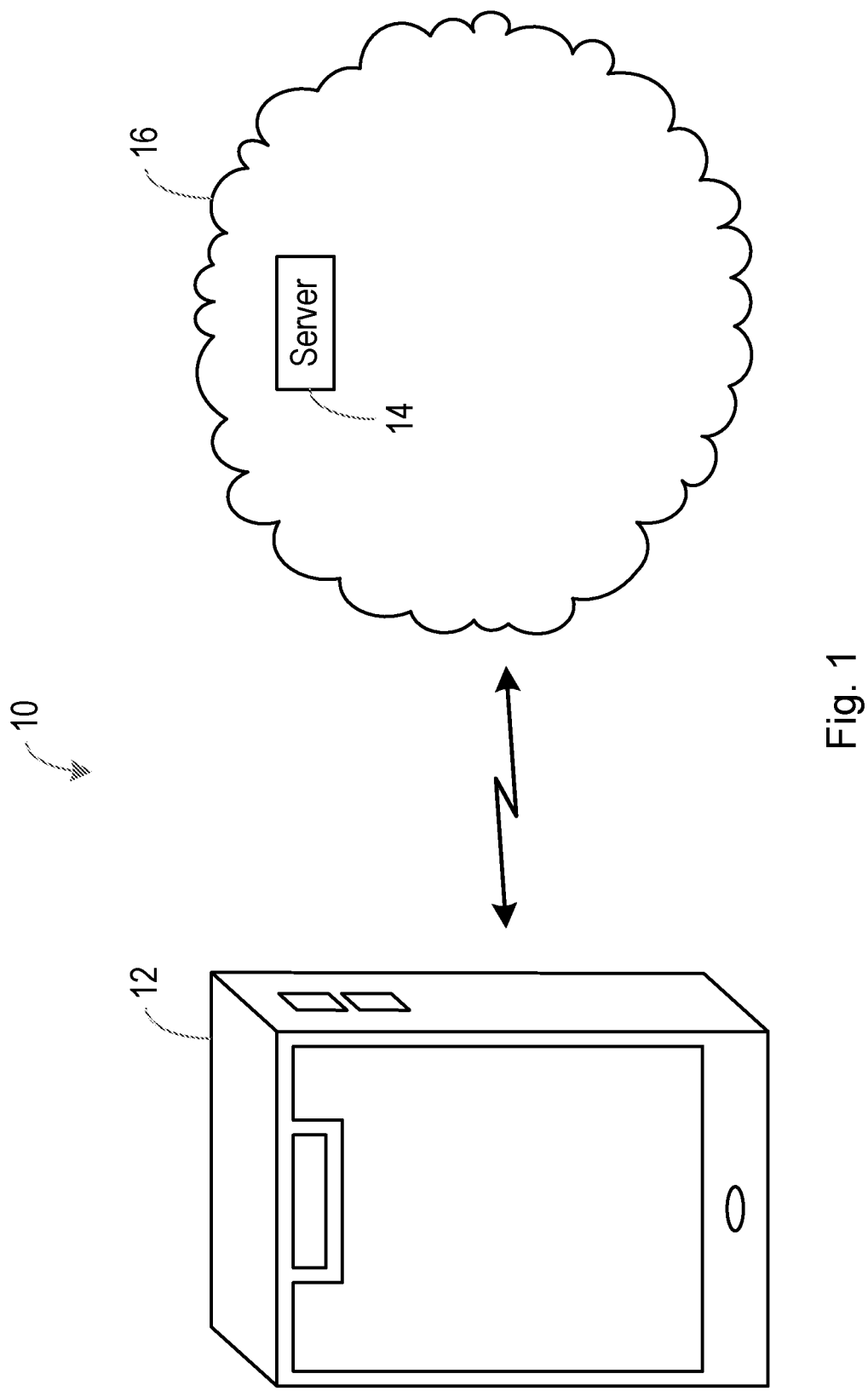
FIG. 1 illustrates a system in accordance with an aspect of the invention.

FIG. 1 shows an example of a system 10 in which the invention may be implemented. In this example, a speaker recognition process takes place in a first device 12. As illustrated here, the first device 12 takes the form of a smartphone, but it may be any (portable) electronic device with some sort of voice operability, for example a smart speaker, a tablet or laptop computer, a games console, a home control system, a home entertainment system, an in-vehicle entertainment system, a domestic appliance, or the like.

The device 12 includes a speaker recognition block. Thus, the device 12 also includes at least one microphone and, when it is determined that a sound detected by the microphone(s) contains speech, the speaker recognition block may for example determine whether or not the speaker is a specific individual, or may identify the speaker from a group of enrolled speakers.

In this embodiment, if it is determined that the speaker is an enrolled speaker, the signal representing the speech may be passed to a separate second device 14 located remotely from the first device 12. For example, the second device 14 may take the form of a server located in the cloud 16, accessible by the first device over a wireless communications network. The second device 14 includes a speech recognition block. When a signal representing speech is supplied to the second device 14, the speech recognition block may obtain information about the content of the speech, for example in order to be able to determine the content of a command.

Although an embodiment is shown here, in which the speaker recognition and the speech recognition take place in separate devices, in other examples, the speaker recognition and the speech recognition take place in the same device, for example a smartphone, a smart speaker, a tablet or laptop computer, a games console, a home control system, a home entertainment system, an in-vehicle entertainment system, a domestic appliance, or the like.

Figure 2:
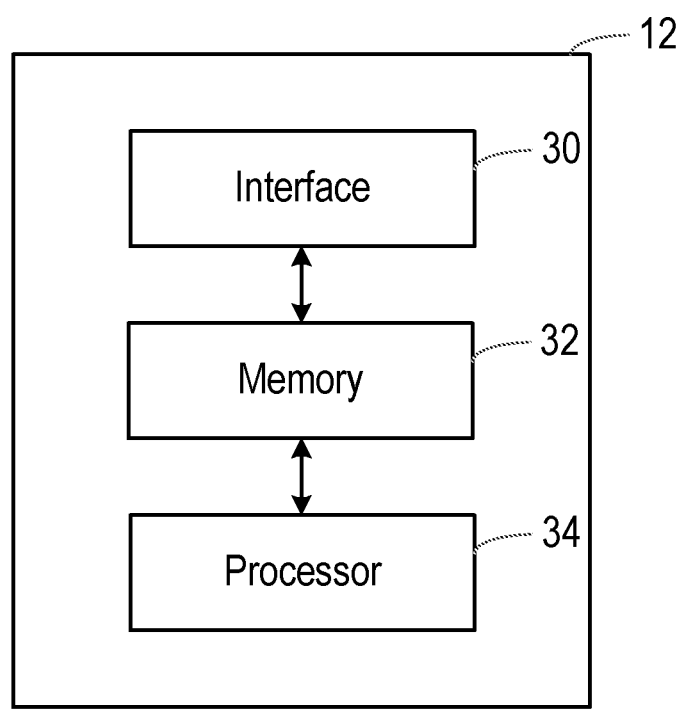
FIG. 2 illustrates an example of a first device in the system of FIG. 1.

FIG. 2 shows one possible form of the first device 12. In this example, the first device 12 includes an interface 30, for connecting to other devices; a memory 32, for storing data and program instructions; and a processor 34, for performing operations in accordance with program instructions stored in the memory 32. Thus, with reference to FIG. 1, the speaker recognition block 22 may be implemented by suitable program instructions stored in the memory 32, causing the processor 34 to perform the speaker recognition functionality.

Figure 3:
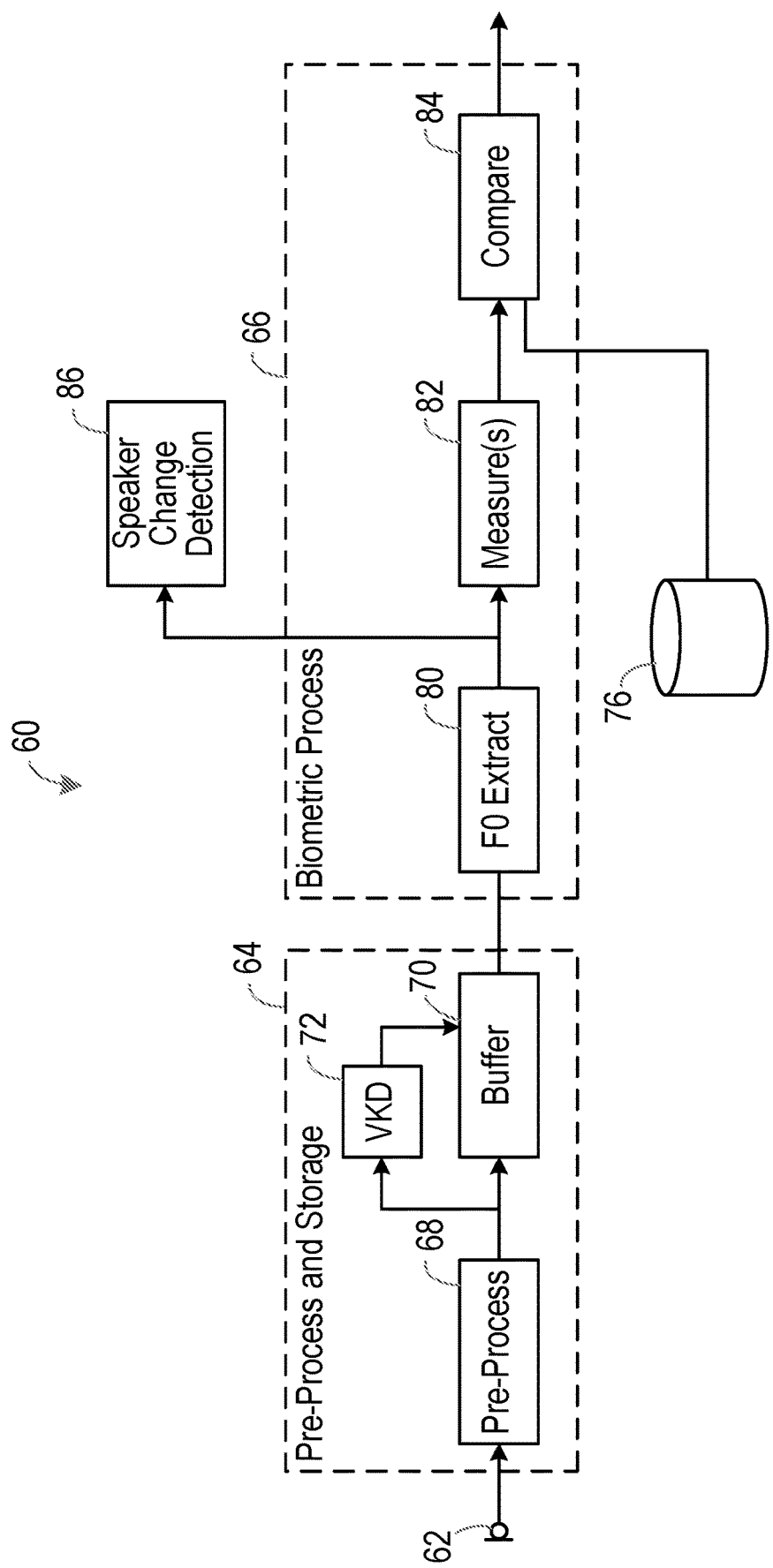
FIG. 3 is a block diagram, illustrating a system in accordance with an aspect of the invention.
Figure 4:
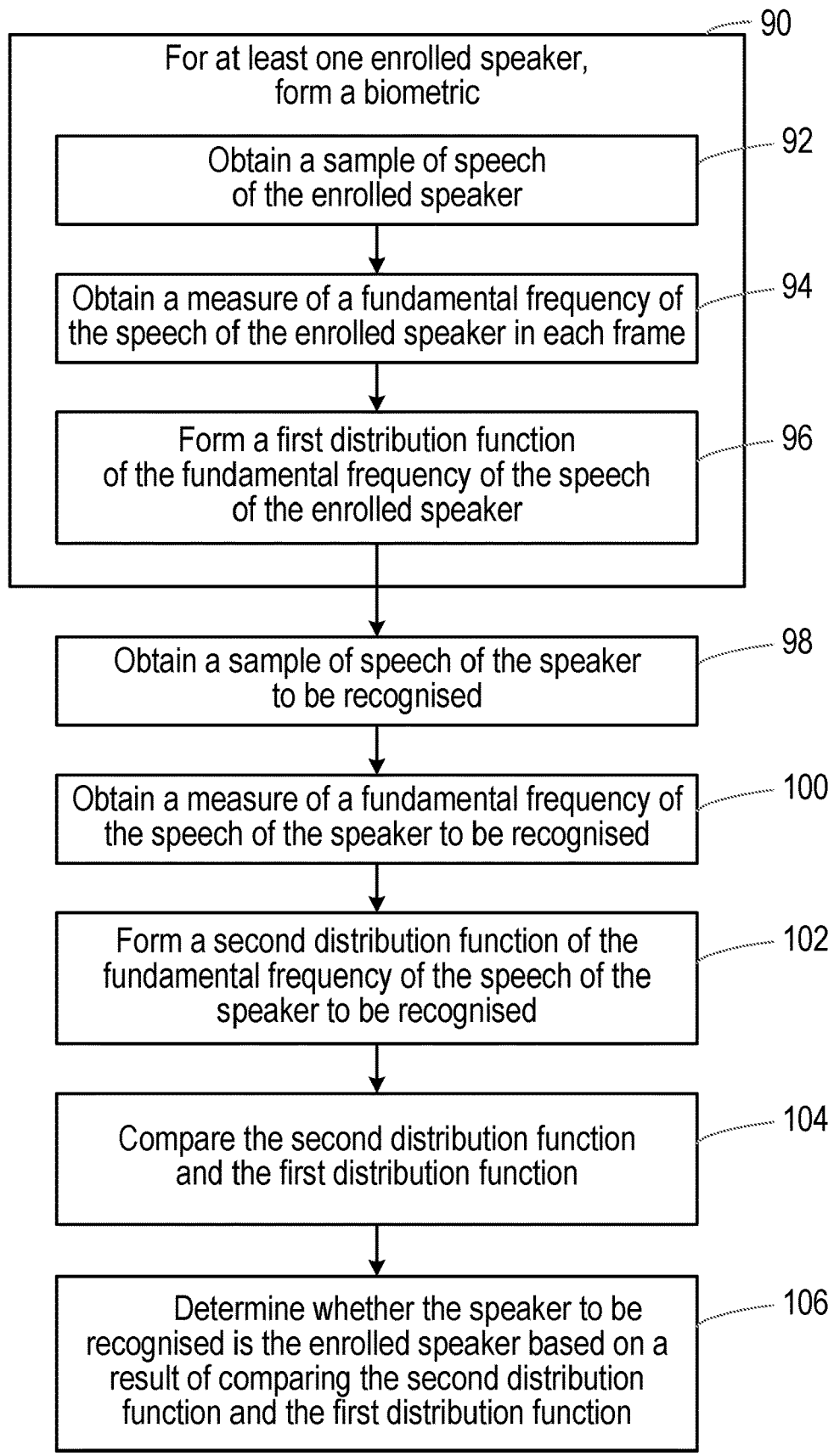
FIG. 4 is a flow chart, illustrating a method in accordance with an aspect of the invention.

FIG. 3 is a block schematic diagram, illustrating a system configured for including speaker change detection as part of the speaker recognition system, and FIG. 4 is a flow chart, illustrating an example of a method of performing speech recognition, in a system as illustrated in FIG. 3, for example. It should be noted that, although FIG. 4 is presented as a flow chart, in which steps are performed successively, this represents just one embodiment. In other embodiments, the order of the steps may be different from that shown in FIG. 4, and/or steps may be performed in parallel, and/or one or more steps may be performed only when another step has been completed (and, in some cases, when the other step has produced one specific result).

FIG. 3 shows a system 60, which includes a microphone 62 for detecting sounds in the vicinity. In embodiments in which the system is implemented in a smartphone or other device, the microphone 62 may be the microphone of that device.

The system 60 also includes a pre-processing and storage block 64, and a biometric processing block 66.

The pre-processing and storage block 64 includes a pre-processing block 68, which performs initial processing on the audio signal generated by the microphone 62, and stores the result in a buffer 70. For example, speaker recognition and speech recognition processes typically operate on signals that have been divided into frames having a duration of 10-30 ms, and so the pre-processing block 68 may perform this division. In addition, the biometric process performed by the block 66 may operate on signals that have been divided into frames with different lengths. In one embodiment, the biometric process performed by the block 66 operates on signals that have been divided into frames with a frame rate of 25 Hz (i.e. a frame length of 40 ms). In general, the frame length needs to be sufficiently short that the speech signal can be considered as quasi-stationary during the frame, while sufficiently long that the pitch period can be measured. The frames may overlap, for example such that each frame starts less than one frame period after the start of the preceding frame. That is, with a frame length of 40 ms, each frame may for example start 20 ms after the preceding frame.

In addition, the pre-processing block 68 may include a voice activity detection block, configured to determine which frames contain speech. More specifically, the pre-processing block 68 may determine which frames contain voiced speech.

In the system illustrated in FIG. 3, the system also includes an optional voice keyword detection (VKD) block 72. This may be configured to detect whether the audio signal represents a predetermined keyword, or trigger phrase. The VKD block 72 may act only on frames that are determined as containing speech.

Thus, the received audio signal is stored, a keyword detection process is performed on the received audio signal, and, when a predetermined keyword is detected, the signal stored in the buffer 70 may be sent to the biometric processing block 66.

Thus, in some embodiments, the audio signal is only passed for subsequent processing if it is determined that the signal contains speech. More specifically, only those frames that are found to contain voiced speech may be passed for subsequent processing. In some embodiments, the audio signal is only passed for subsequent processing if it is determined that the signal contains the predetermined keyword.

Thus, provided that any condition as described above is met, the audio signal, or at least part of the audio signal, is passed to the biometric processing block 66. For example, if the voice keyword detection block 68 determines that the signal contains the predetermined trigger phrase, the part of the signal beginning at the start of the predetermined trigger phrase is sent from the buffer 70 to the biometric processing block 66.

As is common in many biometric processes, the speaker recognition process involves enrolling the user by forming a template, in the form of a voice print, or model of the user's speech, and then comparing a received speech sample with the template. If the degree of similarity between the template and the received speech sample is high enough, it is considered that the received speech sample originated from the enrolled user.

Therefore, referring to FIG. 4, at step 90, a biometric is formed as part of the process of enrolling a user.

The step of forming the biometric is essentially the same as the corresponding steps performed when an audio signal comprising speech is received from the buffer 70 and it is desired to confirm whether the speaker is the previously enrolled user. These steps are described in more detail below. Briefly, the step of forming the biometric comprises, at step 92, obtaining a sample of the speech of the speaker who is enrolling; at step 94, obtaining a measure of a fundamental frequency of the speech of the enrolling speaker in each of a plurality of frames; and, in step 96, forming a first distribution function of the fundamental frequency of the speech of the enrolled speaker.

In the system shown in FIG. 3, the first distribution function that is formed for the enrolling speaker is stored in memory 76.

Figure 5:
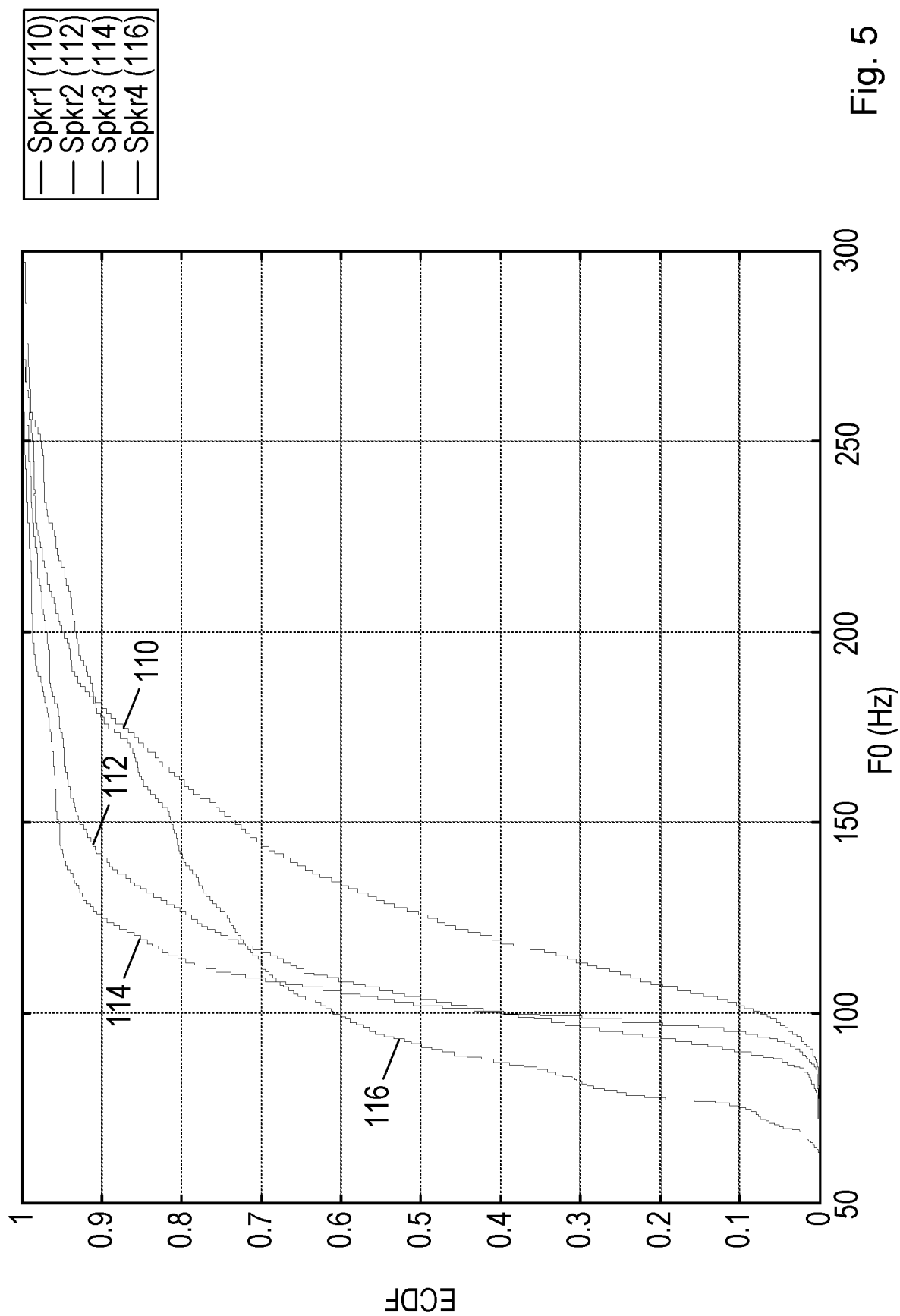
FIG. 5 illustrates some results of performing the method of FIG. 4.

Then, when it is required to determine whether received speech is the speech of the enrolled speaker, in a verification process, a sample of that speech is received in step 98 of FIG. 5, for example from the buffer 70.

The received speech sample is passed to block 80, where, for each frame, a measure of the fundamental frequency, F0, or pitch of the signal is extracted. The pitch can be extracted by simple schemes, for example using the cepstrum or the autocorrelation. Alternatively, more complex and robust methods, such as the so-called PEFAC (Pitch Estimation Filter with Amplitude Compression), can be used. Thus, in step 100, a measure of a fundamental frequency of the speech of the speaker to be recognised is obtained in each of a plurality of speech frames. In one embodiment, the speech frame rate is 250 Hz (i.e. a frame length of 4 ms), and the data rate is 16 kHz so that there are 64 samples per frame.

The information about the fundamental frequency for each frame is passed to a block 82 in the system of FIG. 3, in which one or more feature relating to the fundamental frequency is calculated.

In the embodiment shown in FIG. 4, the feature that is obtained is a second distribution function of the fundamental frequency, which is calculated in a way that makes it comparable with the first distribution function that is obtained during the enrollment process. Thus, in step 102 of FIG. 4, a second distribution function of the fundamental frequency of the speech of the speaker to be recognised is formed.

In some embodiments, the distribution function that is obtained is the cumulative distribution function. That is, the function shows the variation with frequency of the fraction of speech frames for which the fundamental frequency of the speech is below that frequency.

FIG. 5 shows four examples of such cumulative distribution functions 110, 112, 114, 116, for four different speakers. More specifically, FIG. 5 shows empirical cumulative distribution functions (ECDFs). Thus, by way of illustration, the cumulative distribution function 110 relates to speech in which about 8% of frames have the fundamental frequency below 100 Hz and about 74% of samples have the fundamental frequency below 150 Hz, while the cumulative distribution function 116 relates to speech in which about 61% of frames have the fundamental frequency below 100 Hz and about 82% of samples have the fundamental frequency below 150 Hz.

The feature or features obtained in step 102 are passed to a comparison block 84, which is also able to access the memory 76, in which the same feature or features were stored for the speech of the previously enrolled speaker. Thus, in step 104, these features, for example the second distribution function obtained during the verification process, and the first distribution function obtained during the enrollment process, are compared.

When the features obtained in step 96 and step 102 are distribution functions, the step of comparing the features may comprise calculating a value of a statistical distance between some or all of the second distribution function and a corresponding part of the first distribution function.

Figure 6:
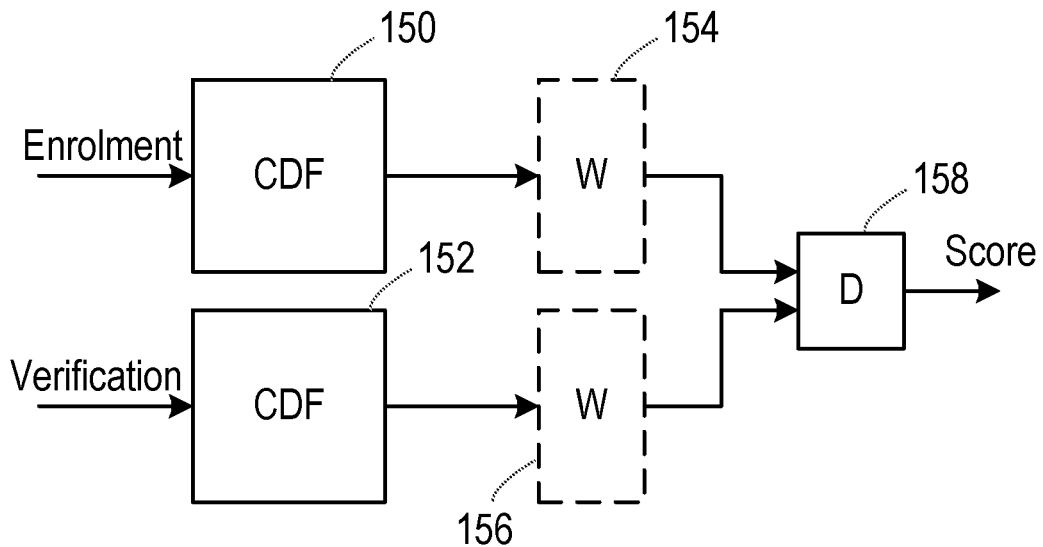
FIG. 6 is a block diagram, illustrating a part of the system of FIG. 3.

FIG. 6 is a block schematic diagram, illustrating a form of the comparison block 84, in a first embodiment. In this embodiment, the distribution functions that are obtained in step 96 and step 102 are cumulative distribution functions. Thus, a first cumulative distribution function (CDF) 150 is obtained during enrollment, and a second cumulative distribution function (CDF) 152 is obtained during verification.

Optionally, respective weighting blocks (W) 154, 156 may then also be provided. The weighting blocks 154, 156 may be configured such that they emphasise the regions of the distribution functions that provide the most useful discriminative information.

For example, referring to the cumulative distribution functions shown in FIG. 5, it can be seen that the largest degree of variation between the functions occurs within the frequency range of approximately 60 Hz to 200 Hz. Therefore, the weighting blocks may be configured to apply a weighting of "1" to the values of the functions at frequency values within this range, and a weighting of "0" to the values of the functions at frequency values outside this range. Other weighting schemes may be used, for example with a higher weighting applied to multiple ranges within the overall total range, and/or with weighting factors other than "1" and "0".

The cumulative distribution functions, after the weightings have been applied if the weighting blocks 154, 156 are provided, are then passed to a scoring block (D) 158, which may for example perform a comparison in the form of a distance calculation, producing a score that can be used (for example by comparison with a threshold value) to determine whether the speech obtained during verification matches the speech obtained during enrollment.

When the features obtained in step 96 and step 102 are cumulative distribution functions, the value of the statistical distance between the second distribution function and the first distribution function may be calculated as:

$$d_{KS} = \max\{|F_{enroll} - F_{test}|\}$$

where $F_{enroll}$ is the first distribution function and $F_{test}$ is the second distribution function, and hence $|F_{enroll} - F_{test}|$ is the vertical distance between the two functions at a given frequency, and, hence, $d_{KS}$ is the maximum value of this vertical distance at any point in the frequency range, also referred to as the Kolmogorov-Smirnov statistic.

Alternatively, the value of the statistical distance between the second distribution function and the first distribution function may be calculated as:

$$d_{IN} = \int |F_{enroll} - F_{test}| df$$

where $F_{enroll}$ is the first distribution function and $F_{test}$ is the second distribution function, and hence $|F_{enroll} - F_{test}|$ is the vertical distance between the two functions at a given frequency, and, hence, $d_{IN}$ is the integral of this vertical distance over the whole frequency range, or over the relevant part or parts of the frequency range that have a weighting of "1" in the example above where different parts of the frequency range have weightings of "1" or "0".

Alternatively, the value of the statistical distance between the second distribution function and the first distribution function may be calculated as:

$$d_{CVM} = \sqrt[p]{\int (F_{enroll} - F_{test})^p df}$$

or, more specifically, when p=2:

$$d_{CVM} = \sqrt{\int (F_{enroll} - F_{test})^2 df}$$

where
$F_{enroll}$ is the first distribution function and
$F_{test}$ is the second distribution function, and hence
$|F_{enroll} - F_{test}|$ is the vertical distance between the two functions at a given frequency.

In other examples, the step of comparing the features may use a machine learning system that has been trained to distinguish between the enrolled speaker and other speakers. For example, a machine learning system may be trained using various pairs of cumulative distribution functions that were obtained from the same speaker, and other pairs of cumulative distribution functions that were obtained from different speakers. The machine learning system may recognise features of the cumulative distribution functions. Then, when presented with the cumulative distribution function obtained from an enrolled speaker in step 96, and with the cumulative distribution function obtained from a speaker to be recognised in step 102, the machine learning system can extract the relevant features from those distribution functions, and can compare those features in order to determine whether the speaker to be recognised should be considered to be the enrolled speaker.

Figure 7:
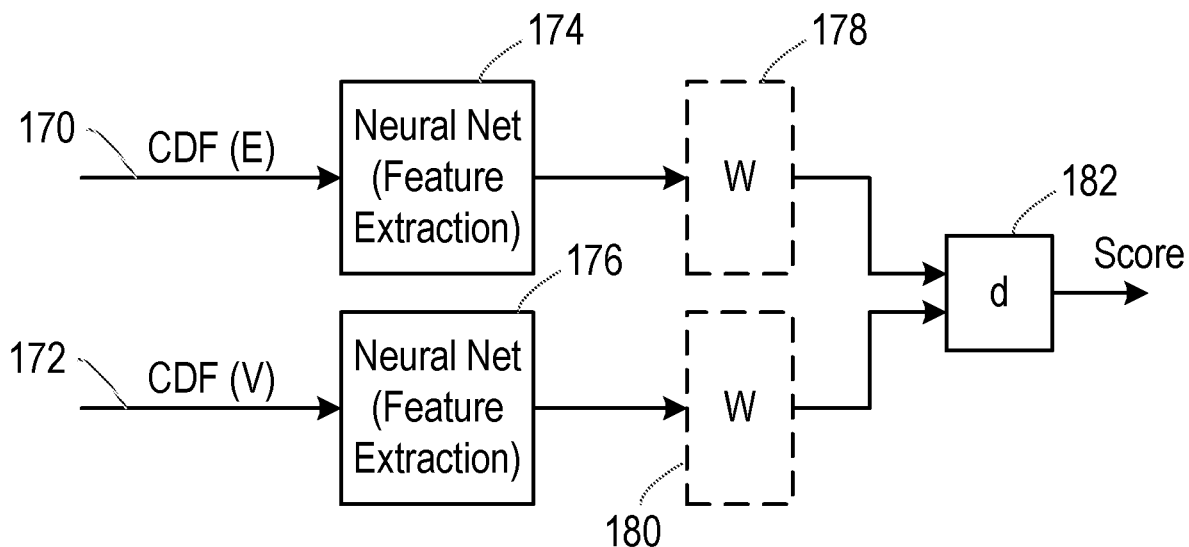
FIG. 7 is a block diagram, illustrating a part of the system of FIG. 3 in a further embodiment.

FIG. 7 is a block schematic diagram, illustrating a form of the comparison block 84, in a second embodiment, in which machine learning is used. In this embodiment, the distribution functions that are obtained in step 96 and step 102 are cumulative distribution functions. Thus, a first cumulative distribution function (CDF(E)) 170 is obtained during enrollment, and a second cumulative distribution function (CDF(V)) 172 is obtained during verification.

The first cumulative distribution function (CDF(E)) 170 obtained during enrollment, and the second cumulative distribution function (CDF(V)) 172 obtained during verification are passed to respective neural nets 174, 176, which have previously been trained offline with large data sets, to perform the appropriate feature extraction.

As described with reference to FIG. 6, after the features have been extracted, respective weighting blocks (W) 178, 180 may then optionally also be provided. The weighting blocks 178, 180 may be configured such that they emphasise features in the regions of the distribution functions that provide the most useful discriminative information. The weightings may for example be determined on the basis of the data sets used for the offline training of the neural nets. The determination of the weightings can be carried out by humans, or it could be largely automated based on predefined datasets. The weightings can be based on other factors. For example, the weightings applied could depend on the gender of the speaker, because the speech of male and female speakers have different frequency profiles. In general the weightings are determined by the required feature selection. Suitable methods for determining the weightings include: Fisher discriminative; Analysis of Variance (Anova); Weighted Cluster Means (WCM); amongst others.

The weighting blocks 178, 180 thus effectively form an "attention layer". For example, the weighting blocks may be configured to apply a weighting of "1" to certain features extracted by the neural nets and a weighting of "0" to certain other features, meaning that these latter features are effectively ignored.

The weighted features can then be scored using a distance calculation. Thus, the features extracted by the neural nets, after any weighting which may be applied, are passed to a scoring block (d) 182, which may for example perform a comparison in the form of a distance calculation, by stacking the weighted features into a feature vector, and using a cosine distance metric to measure the distance between vectors, thereby producing a score that can be used (for example by comparison with a threshold value) to determine whether the speech obtained during verification matches the speech obtained during enrollment.

In a further embodiment, a first score is obtained based on a distance calculation as described with reference to FIG. 6, and a second score is obtained based on the application of machine learning, as described with reference to FIG. 7. The final decision of the speaker recognition system can then be obtained by a process of fusing the separate scores. For example, the first score and the second score can be compared with respective first and second threshold values. The speech provided in the verification phase may then be considered to pass the test if both of the first and second scores exceed the respective threshold value. Other possibilities for fusing the scores also exist.

Although examples are given here in which the distribution functions obtained in step 96 and in step 102 are cumulative distribution functions, other distribution functions, such as probability distribution functions may be used, with appropriate methods for comparing these functions. The methods for comparing may include using machine learning systems as described above.

One possible form of comparison is to determine the degree of similarity between the second distribution function obtained during the verification process and the first distribution function obtained during the enrollment process. As mentioned above, the degree of similarity may for example be judged by calculating a statistical distance between the two distribution functions, or by performing a machine learning process. Then, if the degree of similarity between the second distribution function and the first distribution function is low, it may be judged that it is unlikely that the speech samples obtained during the verification phase and the enrollment phase came from the same person. It may therefore be judged that the speaker to be recognised is the enrolled speaker, or at least that the speaker to be recognised cannot be thought with a high enough degree of confidence to be the enrolled speaker.

Although it is expected that there will be a high degree of similarity between the second distribution function obtained during the verification process and the first distribution function obtained during the enrollment process, if the speaker to be recognised is the enrolled speaker, it is still likely that there will be some small differences between the second distribution function obtained during the verification process and the first distribution function, or between any two distribution functions obtained from different utterances by the same speaker.

One possible attack on voice biometric or speaker recognition systems is a spoof or replay attack, in which a recording of the voice of an enrolled speaker is played during a verification process. If the second distribution function and the first distribution function are identical or nearly identical, i.e. if the degree of similarity between the second distribution function and the first distribution function is extremely high, it may be judged that this is only likely to have arisen because the speech sample obtained during the verification phase was in fact a recording of the speech sample obtained during the enrollment phase. It may therefore be judged that the received speech is not the live speech of the enrolled speaker, and a negative verification result may be output.

Thus, in this example, it may be determined that the verification is not passed if a degree of similarity between the second distribution function and the first distribution function is below a first threshold value, because the input speech is so different from the speech of the enrolled speaker that it probably does not originate from the enrolled speaker, and/or it may be determined that the verification is not passed if a degree of similarity between the second distribution function and the first distribution function is above a second threshold value, because in this case the input speech is so similar to the speech of the enrolled speaker that it is probably a recording of the speech of the enrolled speaker.

As mentioned above, more than one feature relating to the fundamental frequency may be obtained in block 82 of the system of FIG. 3. However, one or more alternative biometric feature may also be obtained, in addition to the cumulative distribution functions of the fundamental frequency of the speech. Specifically, at least one alternative feature of the fundamental frequency of the speech of the enrolled speaker may be obtained.

For example, the at least one alternative feature of the fundamental frequency of the speech of the enrolled speaker may comprise at least one of: the jitter of the speech, i.e. the variability or perturbation of the fundamental frequency; the shimmer of the speech, i.e. the perturbation of the amplitude of the sound; and the fundamental frequency trajectory, i.e. the magnitude or the shape of the change of the fundamental frequency over a given time period of a number of frames (for example covering a time that is longer than would be considered to be jitter).

Based on the result of the comparison in step 104, in step 106, it is determined whether the speaker to be recognised is the enrolled speaker.

There is thus provided a method of speaker recognition that is computationally simple, and can therefore provide a result quickly, in a low power system.

The method shown in FIG. 4 may be combined with another method of speaker recognition. Thus, in step 104, the step of determining whether the speaker to be recognised is the enrolled speaker may comprise: comparing the sample of speech of the speaker to be recognised with an alternative biometric, and fusing the result of comparing the second distribution function and the first distribution function with a result of comparing the sample of speech of the speaker to be recognised with the alternative biometric.

Figure 8:
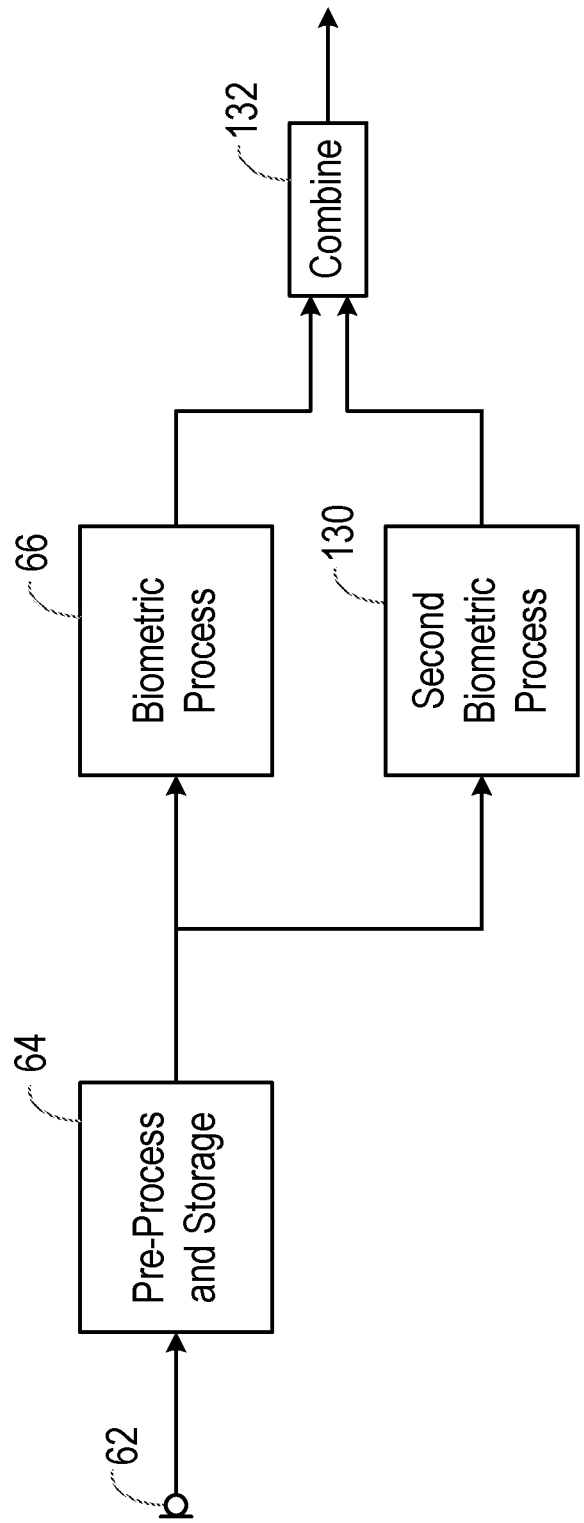
FIG. 8 is a block diagram, illustrating a further system in accordance with an aspect of the invention.

FIG. 8 is a block diagram illustrating a system for performing this combination method. Thus, as described with reference to FIG. 3, a signal generated by a microphone 62 is passed to a pre-processing and storage block 64, and to a biometric processing block 66.

In addition, the signal produced by the pre-processing and storage block 64 is passed to a second biometric process block 130. The second biometric process block 130 may perform any convenient method of speaker recognition. However, it is noted that there is a very loose relationship between the fundamental frequency of a person's speech and the frequency of the formants in that person's speech. Therefore, results obtained from the method of FIG. 4 are largely uncorrelated with results obtained using a second biometric process that uses features dependent on formants of the sample of the speech of the enrolled speaker. As examples of such processes, the second biometric process may use Linear Predictive Coding (LPC) coefficients or Mel-frequency cepstral coefficients (MFCCs) derived from the sample of the speech of the enrolled speaker.

The outputs of the biometric processing block 66 and the second biometric process block 130 are passed to a combining block 132, where they are combined. For example, the combining block 132 may form a weighted sum of results obtained from the biometric processing block 66 and the second biometric process block 130.

This produces a result that is more reliable than any result obtained from just one process alone.

Figure 9:
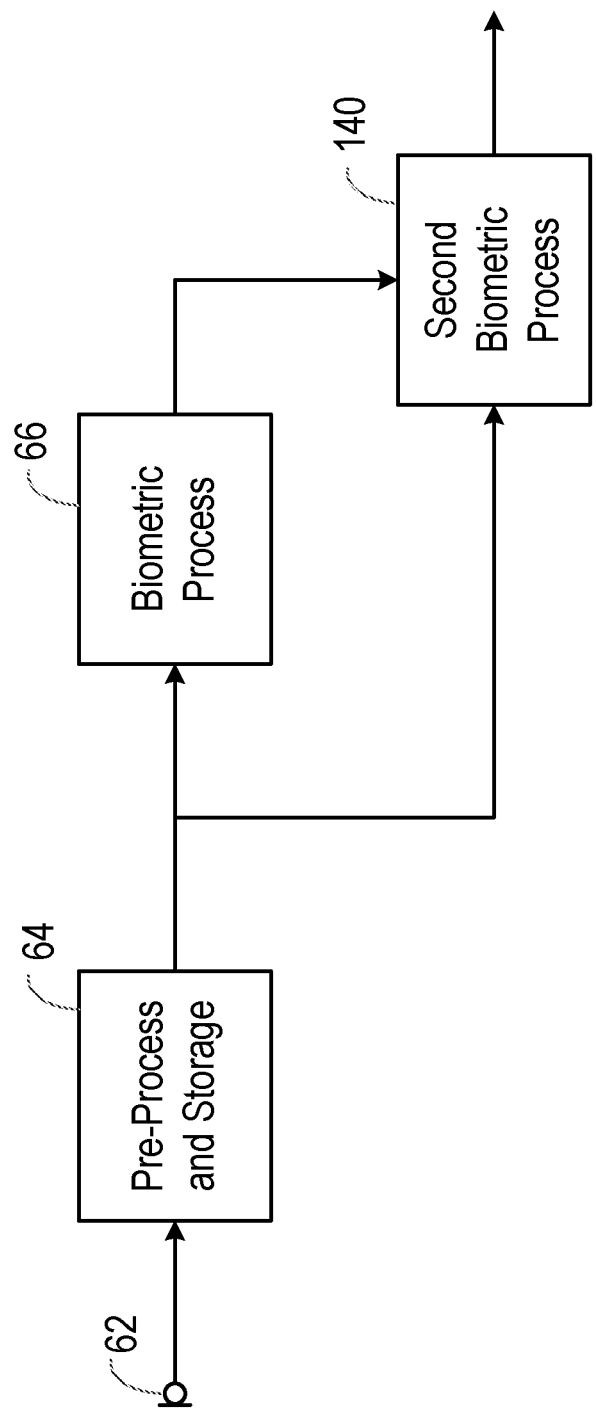
FIG. 9 is a block diagram, illustrating a further system in accordance with an aspect of the invention.

FIG. 9 is a block diagram illustrating an alternative system for performing this combination method. Thus, as described with reference to FIG. 3, a signal generated by a microphone 62 is passed to a pre-processing and storage block 64, and to a biometric processing block 66.

If the output produced by the biometric processing block 66 suggests that the speech is that of the enrolled user, the signal produced by the pre-processing and storage block 64 is passed to a second biometric process block 140. The second biometric process block 140 may perform any convenient method of speaker recognition. As examples of such methods, the second biometric process may use Linear Predictive Coding (LPC) coefficients or Mel-frequency cepstral coefficients (MFCCs) derived from the sample of the speech of the enrolled speaker.

This has the advantage that the low power processing performed by the block 66 may be used to provide an initial check as to whether the speech is that of the enrolled user, with the higher reliability (but higher power) process performed by the second biometric process block 140 only being started if that initial check is passed.

The output of the second biometric process block 140 may then be used as the combined output of the system. Alternatively, the outputs of the block 66 and the second biometric process block 140 may be combined as described above with reference to FIG. 8.

Returning to FIG. 3, the system shown therein can also be used in a method of speaker change detection. Specifically, as described above, a sample of speech is obtained. In each of a plurality of time periods, in block 80, a measure of a fundamental frequency of the speech is obtained. The measures of the fundamental frequency of the speech are passed to a speaker change detection block 86, which compares each measure of the fundamental frequency of the speech with previously obtained measures of the fundamental frequency of the speech. It is then determined that a speaker may have changed, if the measure of the fundamental frequency of the speech differs from previously obtained measures of the fundamental frequency of the speech. For example, a change of more than 10% in the fundamental frequency may be considered to be indicative of a speaker change.

It was mentioned above that speaker recognition could be performed by, in an enrollment phase: obtaining a sample of speech of the enrolled speaker; obtaining a measure of a fundamental frequency of the speech of the enrolled speaker in each of a plurality of speech frames; and forming a first distribution function of the fundamental frequency of the speech of the enrolled speaker. Then, during a verification, the method involves: obtaining a sample of input speech; obtaining a measure of a fundamental frequency of the input speech in each of a plurality of speech frames; and forming a second distribution function of the fundamental frequency of the input speech. The verification then involves comparing the second distribution function and the first distribution function. If the degree of similarity between the second distribution function and the first distribution function is very high, it may be judged that this is likely to have arisen because the speech sample obtained during the verification phase was in fact a recording of the speech sample obtained during the enrollment phase.

This method can be extended by obtaining multiple samples of speech of the enrolled speaker; obtaining a measure of a fundamental frequency of the speech of the enrolled speaker in each of a plurality of speech frames in each of these samples; and forming a plurality of first distribution functions of the fundamental frequency of the speech of the enrolled speaker. During a verification, as before, the method involves: obtaining a sample of input speech; obtaining a measure of a fundamental frequency of the input speech in each of a plurality of speech frames; and forming a second distribution function of the fundamental frequency of the input speech. The verification then involves comparing the second distribution function and each of the plurality of first distribution functions.

If the degree of similarity between the second distribution function and any one of the first distribution functions is very high, it may be judged that this is likely to have arisen because the speech sample obtained during the verification phase was in fact a recording of one of the previously obtained speech samples. It may therefore be judged that the input speech is not the live speech of the enrolled speaker, and a negative verification result may be output.

Figure 10:
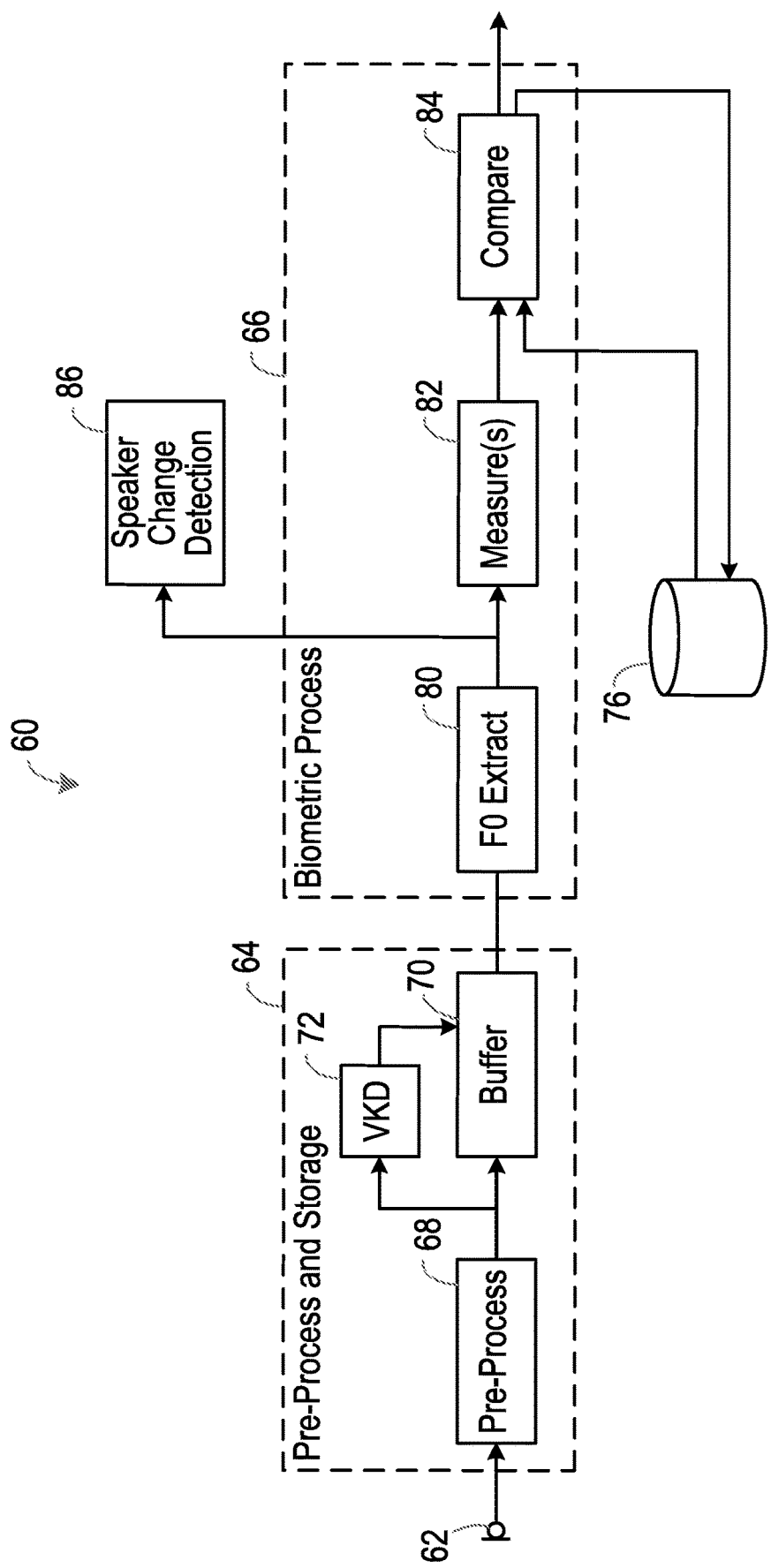
FIG. 10 is a block diagram, illustrating a further system in accordance with an aspect of the invention.

FIG. 10 is a block diagram, illustrating a system for performing this method of detection of a replay attack, also referred to as spoof detection. The system shown in FIG. 10 is the same as that shown in FIG. 3, and the description of FIG. 3 also applies to FIG. 10, except as specified below.

As will be apparent from the description of FIG. 3, during enrollment, a biometric is formed for an enrolled speaker by: obtaining a sample of speech of the enrolled speaker; obtaining a measure of a fundamental frequency of the speech of the enrolled speaker in each of a plurality of speech frames; and forming a first distribution function of the fundamental frequency of the speech of the enrolled speaker.

Then, a verification is performed by: obtaining a sample of input speech; obtaining a measure of a fundamental frequency of the input speech in each of a plurality of speech frames; and forming a second distribution function of the fundamental frequency of the input speech, and by comparing the second distribution function and the first distribution function.

It is determined whether the verification is passed, based on a result of comparing the second distribution function and the first distribution function.

In the system of FIG. 10, whenever any input speech is determined to have passed the verification, i.e. when it is determined that the input speech is the speech of the enrolled speaker, an output is sent from the comparison block 84 to the memory 76. Specifically, the previously calculated second distribution function is treated as an additional first distribution function, and is stored in the memory 76. Information about any desired number of additional first distribution functions may be stored in the memory 76. The input speech that is used for generating the additional first distribution functions may be obtained when a verification is required as described above, or may be obtained from any other speech that is detected by the microphone 62.

Then, when new input speech is received, a new second distribution function of the fundamental frequency of the input speech is formed from a measure of the fundamental frequency in each of a plurality of speech frames.

The comparison block 84 can then compare the new second distribution function with the original first distribution function that was generated from the speech provided at enrollment, and with all of the additional first distribution functions generated from the enrolled user's subsequent speech.

The method of comparison between the new second distribution function and each of the multiple first distribution functions may comprise calculating a value of a statistical distance between some or all of the second distribution function and a corresponding part of the respective first distribution function, for example as described with reference to FIG. 6, or may use a machine learning technique, for example as described with reference to FIG. 7.

If the new second distribution function is considered to be sufficiently similar to any one of the multiple first distribution functions, that is, with such a degree of similarity that it is identical or nearly identical, then it may be determined that the new input speech is not live speech, but is a recording of a previous utterance of the enrolled user.

The two-sample Kolmogorov-Smirnov test can be used to test whether the second distribution function is sufficiently similar to one of the first distribution functions that it should be considered effectively identical to it. That is, for each of the first distribution functions, the maximum distance of the second distribution function from that first distribution function is calculated as:

$$d_{KS} = \max\{|F_1 - F_2|\}$$

where $F_1$ is the first distribution function and $F_2$ is the second distribution function, and hence $|F_1 - F_2|$ is the vertical distance between the two functions at a given frequency, and, hence, $d_{KS}$ is the maximum value of this vertical distance at any point in the frequency range, also referred to as the Kolmogorov-Smirnov statistic.

The calculated value of $d_{KS}$ is then compared with a threshold value, which is set such that, if $d_{KS}$ is below the threshold, the second distribution function can be considered to have a desired probability of being identical to the first distribution function, and hence it may be determined that the new input speech is a recording of a previous utterance of the enrolled user.

In order to reduce the storage requirements placed on the memory 76, it is not necessary to store in full each of the multiple first distribution functions. Rather, it is possible to store in full a smaller number of the multiple first distribution functions, to act as references. In one embodiment, just one of the multiple first distribution functions is stored in full, and used as a reference. In another embodiment, the reference first distribution function is not in fact a distribution function that has been obtained from real speech, but is instead a distribution function that has been generated as an initial estimate, or is an average distribution function that has been generated as an average of multiple distribution functions that have been obtained from real speech. This may be a running average.

Then, information can be stored about each of the other first distribution functions in the form of a respective difference from the reference first distribution function. In some embodiments, the reference first distribution function is selected such that all of the difference values are small and positive, thereby reducing the memory requirements for storing the information.

Thus, there is disclosed a method of detecting a replay attack on a speaker recognition system, the method comprising:
    obtaining a plurality of samples of speech of an enrolled speaker;
    for each of the plurality of samples, obtaining a measure of a fundamental frequency of the speech of the enrolled speaker in each of a plurality of speech frames, and forming a respective first distribution function of the fundamental frequency of the speech of the enrolled speaker,
    obtaining a sample of input speech;
    obtaining a measure of a fundamental frequency of the input speech in each of a plurality of speech frames;
    forming a second distribution function of the fundamental frequency of the input speech;
    comparing the second distribution function and the plurality of first distribution functions; and
    determining that the input speech may result from a replay attack, if the second distribution function is sufficiently similar to any one of the plurality of first distribution functions.

The method may comprise storing the plurality of first distribution functions in the form of a reference first distribution function and a respective plurality of differences from the reference first distribution function.

It was mentioned above that features such as the jitter of the speech and the shimmer of the speech can be used as alternative or additional biometrics.

One specific use of such features is to detect synthesized speech.

Figure 11:
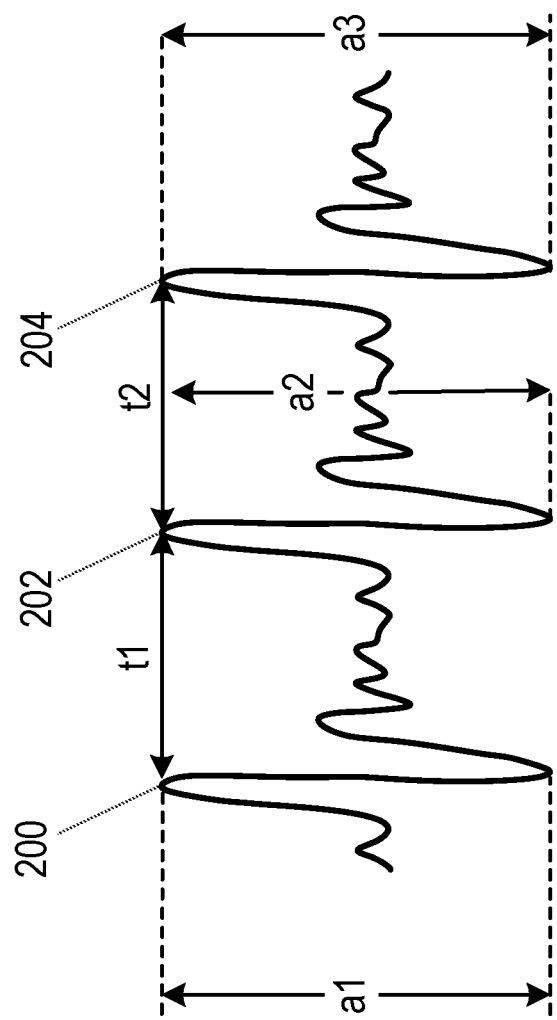
FIG. 11 is a representation of a typical speech signal.

FIG. 11 is a representation of a typical speech signal.

The times t1, t2 etc between successive large peaks 200, 202, 204, etc represent the pitch period of the speech, and the pitch period is the inverse of the fundamental frequency F0.

The peak-to-peak amplitudes a1, a2, a3 etc of these large peaks 200, 202, 204 etc represent the amplitude of the speech.

The fundamental frequency F0 of a human speaker has some variability, which can be described in terms of variability in the pitch periods t1, t2 etc and in the amplitudes a1, a2, a3 etc.

Specifically, the jitter of the speech, i.e. the variability or perturbation of the fundamental frequency, can for example be defined as:
    the absolute difference between two consecutive pitch periods; or
    the absolute difference between a pitch period and the average of the immediately preceding N pitch periods, it divided by an average pitch period.

The shimmer of the speech, i.e. the perturbation of the amplitude of the sound, can for example be defined as:
    the amplitude difference between two consecutive pitch periods at the start of the period; or
    the amplitude difference between the amplitude at the start of one pitch period and the average of the amplitudes at the start of the immediately preceding N pitch periods, divided by an average amplitude.

While human speech typically displays significant amounts of both jitter and shimmer, by contrast speech from a speech synthesiser typically has very little random jitter and shimmer. More specifically, the synthesised speech may have no jitter and/or shimmer, or may have periodic jumps in the pitch period or the amplitude, giving a non Gaussian statistical distribution of the pitch period or the amplitude.

Figure 12:
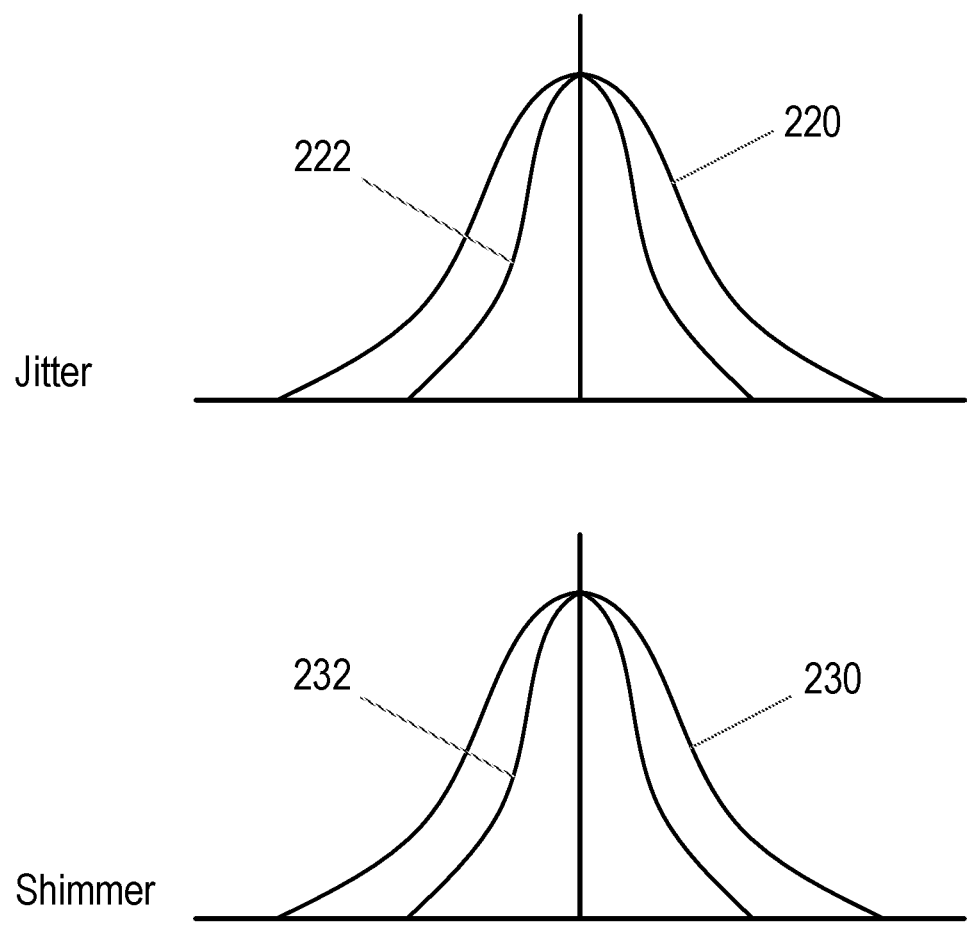
FIG. 12 shows the distribution of the jitter and shimmer values for natural speech and for synthesised speech.

FIG. 12 shows the distribution of the jitter, i.e. the distribution of the jitter values calculated over a large number of pitch periods, for example during multiple frames, such as over the course of a wakeword or trigger phrase, both for natural speech and for synthesised speech. The distribution 220 of the jitter values for natural speech shows considerably greater variability than the distribution 222 of the jitter values for synthesised speech.

Similarly, FIG. 12 shows the distribution of the shimmer, i.e. the distribution of the shimmer values calculated over a large number of pitch periods, for natural speech and for synthesised speech. The distribution 230 of the shimmer values for natural speech shows considerably greater variability than the distribution 232 of the shimmer values for synthesised speech.

Figure 13:
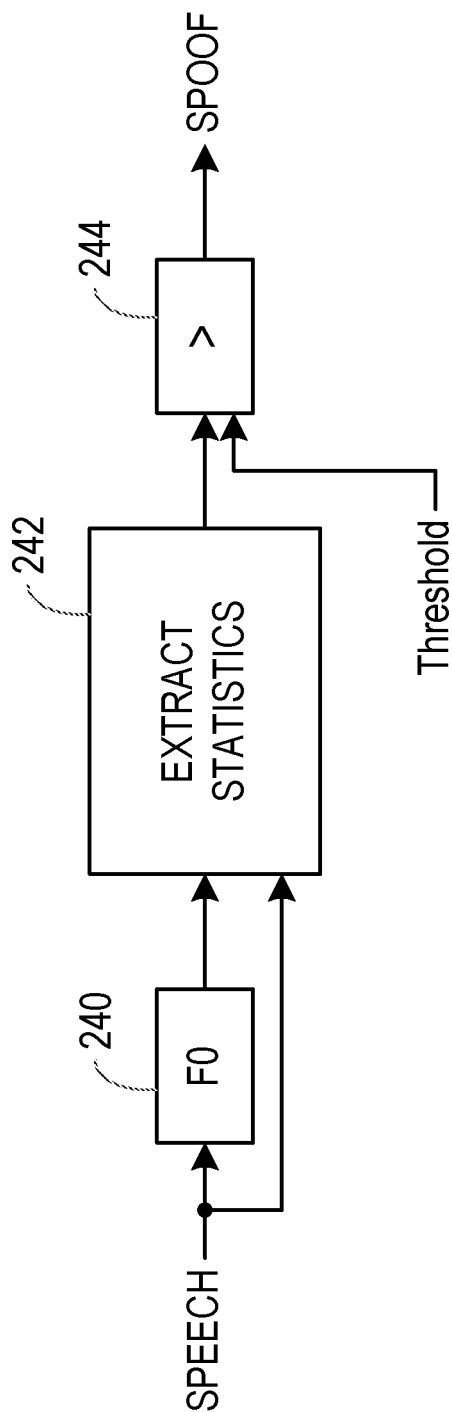
FIG. 13 is a block diagram of a system in accordance with an aspect of the disclosure, for detecting synthesised speech.

FIG. 13 is a block diagram of a system in accordance with an aspect of the disclosure, for detecting synthesised speech.

Specifically, a received speech signal is passed, after any necessary pre-processing as described with reference to FIG. 3, to a fundamental frequency extraction block 240, which operates in the same manner as the block 80 in FIG. 3.

The series of values of the jitter and the shimmer are then calculated from the output of the fundamental frequency extraction block 240 and from the speech signal itself, and statistics relating to the variability of these values (for example a standard deviation value) are extracted in the block 242.

The extracted statistics are then compared in block 244 with respective threshold values for the variability of the values of the jitter and the shimmer. The threshold values may be determined from a corpus of real speech and of synthesised speech, so that the thresholds can distinguish between them. In other embodiments, the average value of the magnitude of the jitter is calculated and/or the average value of the magnitude of the shimmer is calculated, and one or both of these average values is compared with a respective threshold value. Synthesised speech will typically have jitter and shimmer that are of lower average amplitude than real speech, and so the comparison with the threshold can distinguish between them.

If the comparison is failed, then the input speech is flagged as spoofed synthetic speech. In some embodiments, it is determined that the input speech may be a spoof if either the jitter or the shimmer fails the relevant test, i.e. if the variability of either the jitter or the shimmer (or the average magnitude of the jitter and/or the shimmer) is below the respective threshold value. In other embodiments, the variability of the jitter and the variability of the shimmer are combined to give a score that can be used to determine whether the input speech may be a spoof. For example, the variability of the jitter can be used to form a first score representing a likelihood that the input speech is a spoof, and the variability of the shimmer can be used to form a second score representing a likelihood that the input speech is a spoof, and the first and second scores can be combined to give an overall score that is used to indicate whether the input speech may be a spoof.

Thus, there is disclosed a method of detecting synthesised speech, the method comprising:
    obtaining a sample of input speech;
    generating a plurality of values for a pitch period of the input speech, and/or generating a respective plurality of values of a signal amplitude for each pitch period;

generating statistics relating to the plurality of values for the pitch period and/or the plurality of values of the signal amplitude; and determining from said statistics whether the input speech may be synthesised speech.

The method may comprise calculating a plurality of values for the jitter of the input speech, generating statistics relating to the plurality of values for the jitter, forming a measure of variability of the jitter, and determining that the input speech may be synthesised if the measure of variability of the jitter is below a first threshold.

In addition, or alternatively, the method may comprise calculating a plurality of values for the shimmer of the input speech, generating statistics relating to the plurality of values for the shimmer, forming a measure of variability of the shimmer, and determining that the input speech may be synthesised if the measure of variability of the shimmer is below a second threshold.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker recognition, comprising, after forming a biometric for at least one enrolled speaker by:
obtaining a sample of speech of the enrolled speaker;
obtaining a measure of a fundamental frequency of the speech of the enrolled speaker in each of a first plurality of speech frames of the sample of speech of the enrolled speaker; and
forming a first distribution function of the fundamental frequencies in each of the first plurality of speech frames of the speech of the enrolled speaker,
(i) for a speaker to be recognised:
obtaining a sample of speech of the speaker to be recognised;
obtaining a measure of a fundamental frequency of the speech of the speaker to be recognised in each of a second plurality of speech frames of the sample of speech of the speaker to be recognised; and
forming a second distribution function of the fundamental frequencies in each of the second plurality of speech frames of the speech of the speaker to be recognised,
(ii) comparing the second distribution function and the first distribution function, and
(iii) determining whether the speaker to be recognised is the enrolled speaker based on a result of comparing the second distribution function and the first distribution function.

2. The method of claim 1, comprising:
determining which frames of the sample of speech of the enrolled speaker contain voiced speech; and
obtaining the measure of the fundamental frequency of the speech of the enrolled speaker from said frames that contain voiced speech; and
determining which frames of the sample of input speech contain voiced speech; and
obtaining the measure of the fundamental frequency of the input speech from said frames that contain voiced speech.

3. The method of claim 1, wherein the first distribution function and the second distribution function are cumulative distribution functions.

4. The method of claim 1, wherein the step of comparing the second distribution function and the first distribution function comprises calculating a value of a statistical distance between the second distribution function and the first distribution function.

5. The method of claim 4, wherein the value of the statistical distance between the second distribution function and the first distribution function is calculated as:

$$d_{KS} = \max\{|F_{enroll} - F_{test}|\}$$

where
$F_{enroll}$ is the first distribution function and
$F_{test}$ is the second distribution function, and hence
$|F_{enroll} - F_{test}|$ is the vertical distance between the two functions at a given frequency.

6. The method of claim 4, wherein the value of the statistical distance between the second distribution function and the first distribution function is calculated as:

$$d_{IN} = \int |F_{enroll} - F_{test}| df$$

where
$F_{enroll}$ is the first distribution function and
$F_{test}$ is the second distribution function, and hence
$|F_{enroll} - F_{test}|$ is the vertical distance between the two functions at a given frequency.

7. The method according to claim 4, wherein the value of the statistical distance between the second distribution function and the first distribution function is calculated as:

$$d_{CVM} = \sqrt[p]{\int (F_{enroll} - F_{test})^p df}$$

where
$F_{enroll}$ is the first distribution function and
$F_{test}$ is the second distribution function, and hence
$|F_{enroll} - F_{test}|$ is the vertical distance between the two functions at a given frequency.

8. The method of claim 1, wherein the step of comparing the second distribution function and the first distribution function comprises using a machine learning system.

9. The method of claim 8, wherein the machine learning system has been trained to distinguish between the enrolled speaker and other speakers.

10. The method of claim 8, wherein the machine learning system is used to extract features from the first distribution function and the second distribution function.

11. The method of claim 1, wherein determining whether the verification is passed comprises determining that the verification is not passed if a degree of similarity between the second distribution function and the first distribution function is below a first threshold value.

12. The method of claim 1, wherein determining whether the verification is passed comprises determining that the verification is not passed if a degree of similarity between the second distribution function and the first distribution function is above a second threshold value.

13. The method of claim 1, wherein the step of determining whether the verification is passed comprises:
comparing the sample of input speech with an alternative biometric, and
fusing the result of comparing the second distribution function and the first distribution function with a result of comparing the sample of input speech with the alternative biometric.

14. The method of claim 13, wherein the alternative biometric uses features dependent on formants of the sample of the speech of the enrolled speaker.

15. The method of claim 14, wherein the alternative biometric uses or Mel-frequency cepstral coefficients, MFCCs, derived from the sample of the speech of the enrolled speaker.

16. The method of claim 14, wherein the alternative biometric uses Linear Predictive Coding, LPC, coefficients derived from the sample of the speech of the enrolled speaker.

17. The method of claim 13, wherein the alternative biometric uses at least one alternative feature of the fundamental frequency of the speech of the enrolled speaker.

18. The method of claim 17, wherein the at least one alternative feature of the fundamental frequency of the speech of the enrolled speaker comprises at least one of: jitter, shimmer, and fundamental frequency trajectory.

19. The method of claim 1, further comprising:
in response to determining that the verification is passed, initiating an alternative method of speaker recognition.

20. A system comprising:
an input for receiving an audio signal representing speech; and
a processor configured to
obtain a sample of speech of the enrolled speaker;
obtain a measure of a fundamental frequency of the speech of the enrolled speaker in each of a first plurality of speech frames of the sample of speech of the enrolled speaker; and
form a first distribution function of the fundamental frequencies in each of the first plurality of speech frames of the speech of the enrolled speaker,
(i) for a speaker to be recognised:
obtain a sample of speech of the speaker to be recognised;
obtain a measure of a fundamental frequency of the speech of the speaker to be recognised in each of a second plurality of speech frames of the sample of speech of the speaker to be recognised; and
form a second distribution function of the fundamental frequencies in each of the second plurality of speech frames of the speech of the speaker to be recognised,
(ii) compare the second distribution function and the first distribution function, and
(iii) determine whether the speaker to be recognised is the enrolled speaker based on a result of comparing the second distribution function and the first distribution function.

21. The system of claim 20, wherein the system is implemented in an electronic device, for example a smartphone or other communications device, a smart speaker, a tablet or laptop computer, a games console, a home control system, a home entertainment system, an in-vehicle entertainment system, or a domestic appliance.

22. A non-transitory storage medium having stored thereon software code which is configured to, when run on a suitable processor
obtain a sample of speech of the enrolled speaker;
obtain a measure of a fundamental frequency of the speech of the enrolled speaker in each of a first plurality of speech frames of the sample of speech of the enrolled speaker; and
form a first distribution function of the fundamental frequencies in each of the first plurality of speech frames of the speech of the enrolled speaker,
(i) for a speaker to be recognised:
obtain a sample of speech of the speaker to be recognised;
obtain a measure of a fundamental frequency of the speech of the speaker to be recognised in each of a second plurality of speech frames of the sample of speech of the speaker to be recognised; and
form a second distribution function of the fundamental frequencies in each of the second plurality of speech frames of the speech of the speaker to be recognised,
(ii) compare the second distribution function and the first distribution function, and
(iii) determine whether the speaker to be recognised is the enrolled speaker based on a result of comparing the second distribution function and the first distribution function.

23. A method of speaker change detection, comprising:
obtaining a sample of speech;
in each of a plurality of time periods, obtaining a measure of a fundamental frequency of the speech;
comparing the measure of the fundamental frequency of the speech with previously obtained measures of the fundamental frequency of the speech; and
determining that a speaker may have changed in the event that the measure of the fundamental frequency of the speech differs from previously obtained measures of the fundamental frequency of the speech.

24. A system comprising:
an input for receiving an audio signal representing speech; and
a processor configured to
obtain a sample of speech;
in each of a plurality of time periods, obtain a measure of a fundamental frequency of the speech;
compare the measure of the fundamental frequency of the speech with previously obtained measures of the fundamental frequency of the speech; and
determine that a speaker may have changed in the event that the measure of the fundamental frequency of the speech differs from previously obtained measures of the fundamental frequency of the speech.

25. The system of claim 24, wherein the system is implemented in an electronic device, for example a smartphone or other communications device, a smart speaker, a tablet or laptop computer, a games console, a home control system, a home entertainment system, an in-vehicle entertainment system, or a domestic appliance.

26. A non-transitory storage medium having stored thereon software code which is configured to, when run on a suitable processor, obtain a sample of speech;
- in each of a plurality of time periods, obtain a measure of a fundamental frequency of the speech;
- compare the measure of the fundamental frequency of the speech with previously obtained measures of the fundamental frequency of the speech; and
- determine that a speaker may have changed in the event that the measure of the fundamental frequency of the speech differs from previously obtained measures of the fundamental frequency of the speech.

\* \* \* \* \*

UNITED STATES PATENT AND TRADEMARK OFFICE
CERTIFICATE OF CORRECTION

PATENT NO. : 11,081,115 B2
APPLICATION NO. : 16/556582
DATED : August 3, 2021
INVENTOR(S) : John Paul Lesso It is certified that error appears in the above-identified patent and that said Letters Patent is hereby corrected as shown below:

In the Claims

1. In Column 17, Line 52, in Claim 20, delete "to" and insert -- to: --, therefor.

2. In Column 18, Line 20, in Claim 22, delete "processor" and insert -- processor: --, therefor.

3. In Column 18, Line 59, in Claim 24, delete "to" and insert -- to: --, therefor.

Signed and Sealed this
Fifteenth Day of August, 2023

Katherine Kelly Vidal

Katherine Kelly Vidal
*Director of the United States Patent and Trademark Office*